P. J. BLOCK.
TONGUE SUPPORTING ATTACHMENT FOR CULTIVATORS AND PLANTERS.
APPLICATION FILED JUNE 14, 1917.
1,252,225. Patented Jan. 1, 1918.
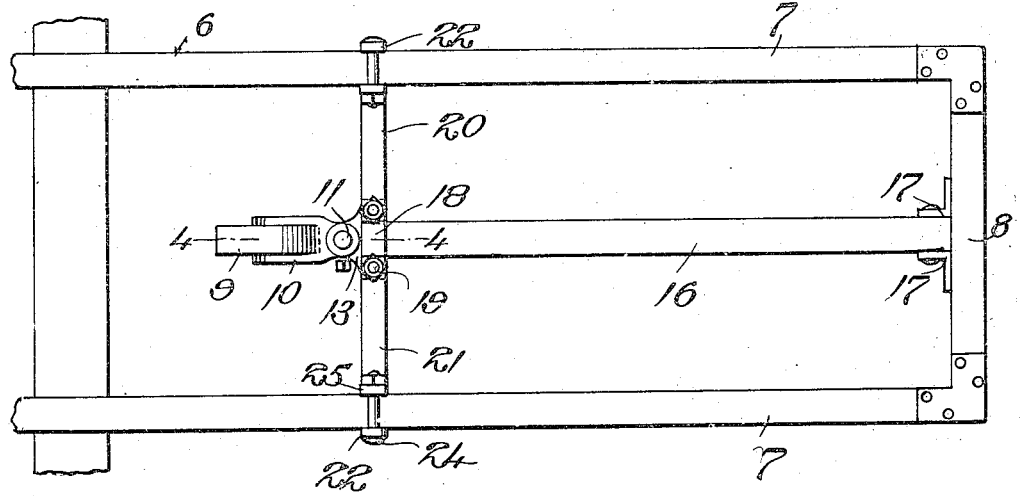
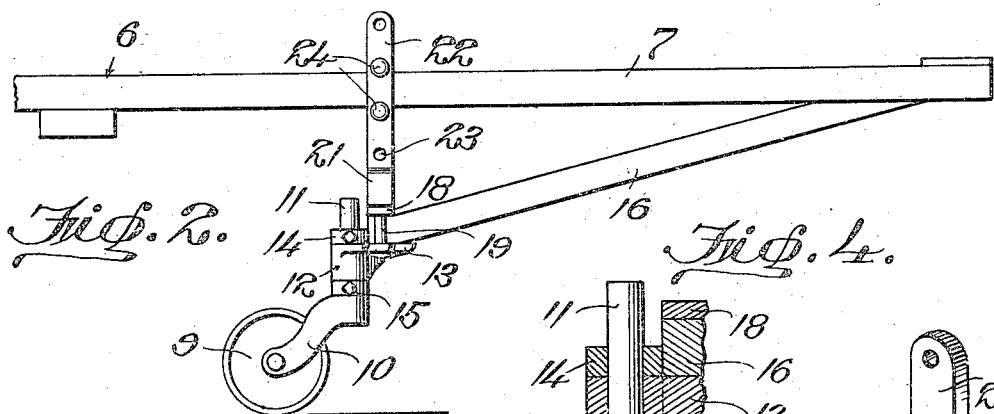
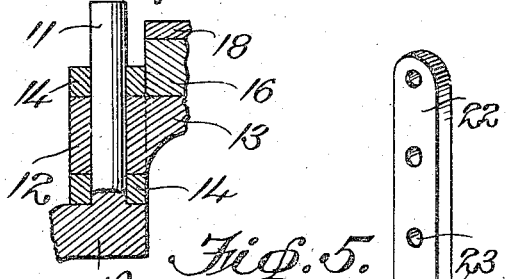
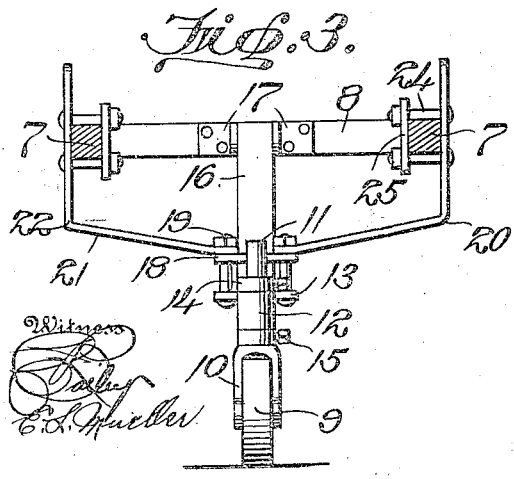
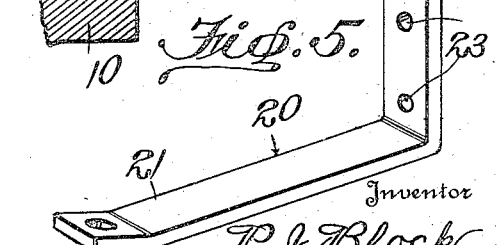
Inventor
P. J. Block,

UNITED STATES PATENT OFFICE.

PAUL J. BLOCK, OF BALLINGER, TEXAS.

TONGUE-SUPPORTING ATTACHMENT FOR CULTIVATORS AND PLANTERS.

1,252,225.   Specification of Letters Patent.   Patented Jan. 1, 1918.

Application filed June 14, 1917. Serial No. 174,745.

*To all whom it may concern:*

Be it known that I, PAUL J. BLOCK, a citizen of the United States, residing at Ballinger, in the county of Runnels, State of Texas, have invented certain new and useful Improvements in Tongue-Supporting Attachments for Cultivators and Planters; and I do hereby declare the following to be a full, clear, and exact description of the invention, such as will enable others skilled in the art to which it appertains to make and use the same.

This invention is an improvement in agricultural machines and has particular reference to a tongue supporting attachment for cultivators.

An object of the invention is to provide an improved support for the tongues of a cultivator whereby to relieve the draft animal of the weight of said tongues and, to this end, use is made of a caster to which a plurality of supporting members are connected and secured to the tongues whereby the same are held in their raised or operative positions.

Another object is to provide for the vertical adjustment of the tongues by adjustably mounting upon the spindle of the casing a bearing to which the supporting members are connected.

A further object is to provide an attachment of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a top plan view of the tongue frame of a cultivator showing the attachment applied thereto.

Fig. 2 is a side elevation.

Fig. 3 is a rear elevation, the tongue being shown in cross section.

Fig. 4 is an enlarged section on the line 4—4 of Fig. 1.

Fig. 5 is a detail perspective view of one of the bracing and supporting members.

The invention is preferably employed in connection with two row cultivators of any desired type having the usual tongue frame generally indicated by the numeral 6 and consisting of the tongues 7 connected at their forward ends by means of the cross arm 8.

The attachment which comprises the essential feature of the invention is employed for the purpose of supporting the tongues 7 in their raised or operative positions so as to relieve the strain upon the draft animals occasioned by the weight of said tongues and the attachment preferably comprises a casting wheel 9 to which is connected the fork 10 having the spindle 11 extending vertically therefrom. Slidably mounted upon the spindle 11 is an adjustable bearing or casting 12 having a horizontal top plate 13 and held in adjusted positions upon the spindle by means of collars 14 secured to the spindle by set screws 15.

When in operative position the casting is located between the tongues 7 and adjacent the rear ends thereof and the top plate 13 of the bearing 12 has resting thereon the rear end of a longitudinally and upwardly extending bracing and supporting member 16 preferably in the form of an elongated bar having its forward end secured to the cross arm 8, intermediate its end, by the angle irons 17. The rear end of the member 16 is secured to the top plate 13 of the bearing by a transverse clamping plate 18 resting upon the top of said member and secured in position by means of bolts 19 extending through said top plate on each side of the member 16 and engaging in said clamping plate.

The invention further contemplates the provision of additional supporting members, generally indicated by the numeral 20, arranged transversely of the member 16 and each including angularly disposed arms 21 and 22, the former having its free end mounted upon one of the bolts 19 and extending upwardly therefrom in a diagonal direction. The arm 22 of each member 20 extends in a substantially vertical direction and preferably on the exterior side of the adjacent tongues 7, said arm being provided with a plurality of bolt openings 23 for receiving the bolts 24 upon which is mounted a clamping plate 25 for engagement with the inner side of the tongue 7 whereby said member 20 is securely fastened to the tongue.

It will be apparent from this description that the tongues 7 may be vertically adjusted by mounting the bolts 24 in different openings 23 or by adjusting the bearing 12 longitudinally of the spindle 11 through the medium of the collars 14. It will also be obvious that by the provision of a plurality of bracing and supporting members 16 and 20 and the casting 9, the tongue frame 6 will be supported in its operative position and the draft animals will be relieved of the weight thereof at all times.

What is claimed is:—

1. In an agricultural machine, the combination with the tongue frame including tongues and a cross arm connecting the same; of supporting casters positioned between said tongues and having a spindle, a bearing member adjustably mounted upon said spindle, a supporting member having one end resting upon said bearing and extending longitudinally of said tongues and having its other end secured to the cross arm of said tongue frame, other bracing and supporting members arranged transversely of the first named supporting member and secured to said tongues, a clamping plate contacting the first named supporting member, and means engaging said clamping plate and the second named supporting members and said bearing for securing all of said supporting members to said bearing.

2. In an agricultural machine, the combination with the tongue frame including tongues and a cross arm connecting the same; of supporting casters positioned between said tongues and having a spindle, a bearing member adjustably mounted upon said spindle, a supporting member having one end resting upon said bearing and extending longitudinally of said tongues and having its other end secured to the cross arm of said tongue frame, other bracing and supporting members arranged transversely of the first named supporting member and secured to said tongues, each of the last named supporting members comprising angularly disposed arms one of which is arranged in substantially vertical position and secured to the adjacent tongue, the free end of the other arm being arranged adjacent the rear end of the first named supporting member, and means for securing the adjacent ends of said supporting members to said bearing.

In testimony whereof, I affix my signature in the presence of two witnesses.

PAUL J. BLOCK.

Witnesses:
I. V. MILLER,
EWALD STROOCH.

Copies of this patent may be obtained for five cents each, by addressing the "Commissioner of Patents, Washington, D. C."